United States Patent
Kessler (10) Patent No.: US 6,298,477 B1
(45) Date of Patent: Oct. 2, 2001

(54) METHOD AND APPARATUS FOR SELECTING WAYS TO COMPILE AT RUNTIME

(75) Inventor: Peter B. Kessler, Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/183,499

(22) Filed: Oct. 30, 1998

(51) Int. Cl.$^7$ ........................................ G06F 9/45
(52) U.S. Cl. ................... 717/5; 712/222; 717/9
(58) Field of Search .................... 717/4, 5, 6, 9; 712/222, 227

(56) References Cited

U.S. PATENT DOCUMENTS 5,854,932 * 12/1998 Mariani et al. ........................ 595/709
5,960,202 * 9/1999 Granston et al. ...................... 395/705
6,078,744 * 6/2000 Wolczko et al. ....................... 395/705

OTHER PUBLICATIONS

Goldberg. What Every Computer Scientists Should Know About Floating–Point Arithmetic. ACM. pp. 5–48, Mar. 1991.*

Johnson. Trap Architectures for Lisp Systems. ACM. pp. 79–86, 1990.*

* cited by examiner

Primary Examiner—Kakali Chaki
Assistant Examiner—Wei Zhen
(74) Attorney, Agent, or Firm—Beyer Weaver & Thomas, LLP (57) ABSTRACT

Apparatus, methods, and computer program products are disclosed for determining how to compile a program at runtime. A bytecode instruction associated with the program that can be compiled in multiple ways is retrieved and compiled in a particular way, typically the default way. At runtime, a virtual machine determines whether another way of compiling the bytecode instruction is more desirable and, if so, the bytecode is then recompiled the other way. In some embodiments, the portion of the program that contains the bytecode instruction to be recompiled is placed in a queue with other instructions that are to be recompiled. The virtual machine may examine changing requirements of the program that have developed at the program's execution in which the requirements are derived from profile data on each of the multiple ways the program can be compiled. The bytecode instruction within the program may be recompiled in a more preferred way based upon the profile data.

33 Claims, 9 Drawing Sheets

METHOD AND APPARATUS FOR SELECTING WAYS TO COMPILE AT RUNTIME

BACKGROUND OF THE INVENTION

The present invention relates generally to the field of computer software and software portability. In particular, it relates to methods of compiling a program according to platform-specific requirements.

The Java™ virtual machine (JVM) can be implemented on a variety of different computer architectures and can accommodate different specifications and standards stemming from different microprocessors. An example of such a standard is the extended precision floating point format utilized by some microprocessors when manipulating floating point numbers. One such microprocessor is Intel Corporation's IA-32 microprocessor architecture which uses the extended precision (80 bit) floating point calculations. Other processors typically use single (32 bit) or double (64 bit) precision floating point calculations.

A problem occurs when values computed in extended precision format are converted to single or double precision format. The example problem arises because the Java™ language specifies that floating point operations must produce results with the range and precision specified by IEEE 754, incorporated herein by reference for all purposes, whereas the Intel IA-32 processors, made by the Intel Corporation of Santa Clara, Calif., produce results with greater range and precision. These wider results must be accurately rounded to IEEE 754 single and double precision format. On the IA-32 microprocessor there are at least two ways to implement such rounding, each with different costs (code size and execution speed). A static compiler (or a one-time dynamic compiler) needs to choose one implementation, and that choice will not be the best choice in all circumstances. The problem is illustrated in FIG. 1.

Figure 1:
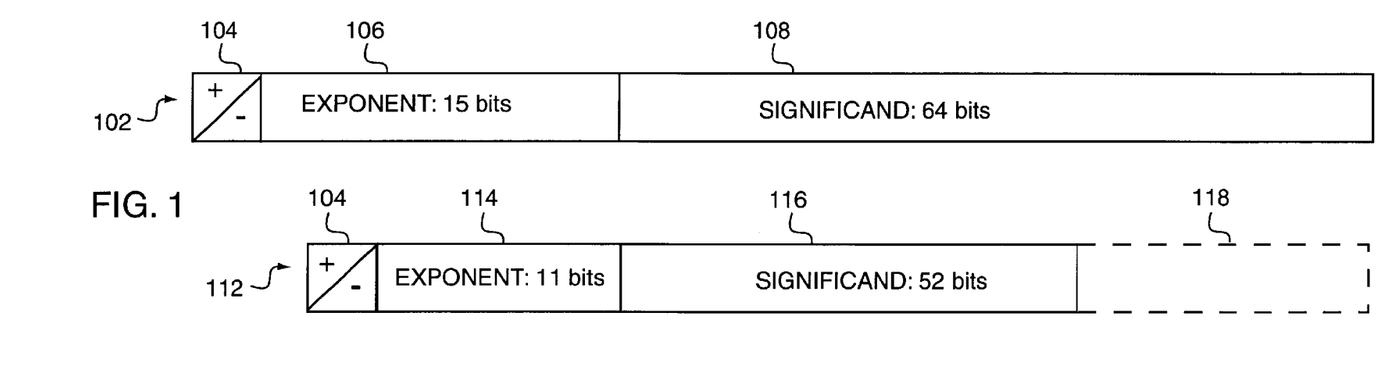
FIG. 1 is a block diagram showing a typical format of double precision floating point and the format of extended precision floating point as known in the prior art.

FIG. 1 is a block diagram describing a typical format of double precision floating point and the format of extended precision floating point. Format 102 illustrates an extended precision floating point number format of the Intel IA-32 architecture, as opposed to double precision floating point format of the Intel IA-32. A sign bit 104 indicates whether the number is positive or negative. This is followed by bits 106 which represent an exponent value for representing an exponential value of the floating point is number.

Bits 108 contain bits for holding a significand. The significand portion can hold up to 64 bits for representing the integer portion of the number.

Thus, there are 80 (1+15+64) bits in the extended precision floating point format. Floating point operations are typically handled by a floating point unit. This unit can efficiently perform complicated operations involving floating point numbers by manipulating the significand and the exponent. As is well known in the art, representing floating point numbers as integers and exponents make calculations on floating point numbers significantly easier. Also referred to in FIG. 1 is a double precision floating point format 112, described in IEEE 754. This format is similar in layout to that of the extended precision format, but differs in the number of bits in the exponent and significand fields. As mentioned above, the Intel IA-32 processor produces results in extended format. The example problem comes from the *The Java™ Language Specification* by James Gosling, Bill Joy, and Guy Steele (ISBN 0-201-63451-1), which is incorporated herein by reference in its entirety, in which results need to be produced in IEEE 754 single or double format.

Returning to format 112, sign bit 104 is the same as in the extended format, as opposed to double or single precision format. Exponent bits 114 have the same function as bits 106 but holds 11 bits as opposed to 15 bits in the extended format. Significand bits 116 holds 52 bits as opposed to 64 bits in the extended format. Thus, the double precision floating point format can hold 64 bits. The difference in the significand lengths is referred to by the dashed area 118 in FIG. 1 (the 4 bit difference in exponent length is not illustrated similarly in the figure).

Problems arise from the Java language requiring a single or double format result when given an extended precision result from an IA-32 processor, for example. If the extended exponent is outside the range of single or double precision, overflow or underflow will occur. On the IA-32, overflow is handled by the hardware, but can be addressed by methods described in the present invention. Underflow is more difficult to treat since the significand can be shifted (to the right) to reduce the exponent. However, this shifting loses bits of the significand, and therefore precision of the result. Computing the correct, less-precise, significand requires several instructions, and the operation is typically put in a separate subroutine to be invoked when needed. The example problem is not the correct rounding of the result, but the detection that the correction should occur.

Figure 2A:
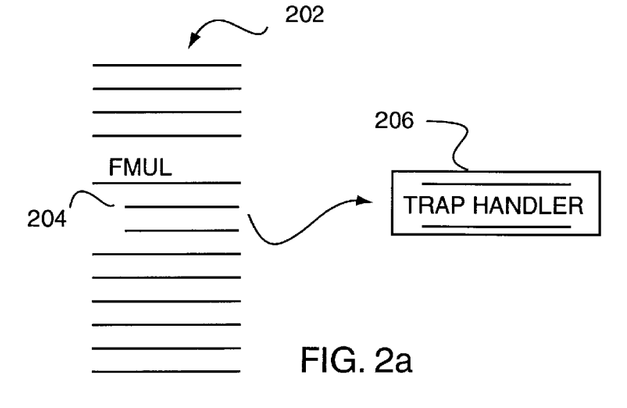
FIGS. 2a and 2b illustrate two methods of detecting floating point underflow as are known in the prior art.
Figure 2B:
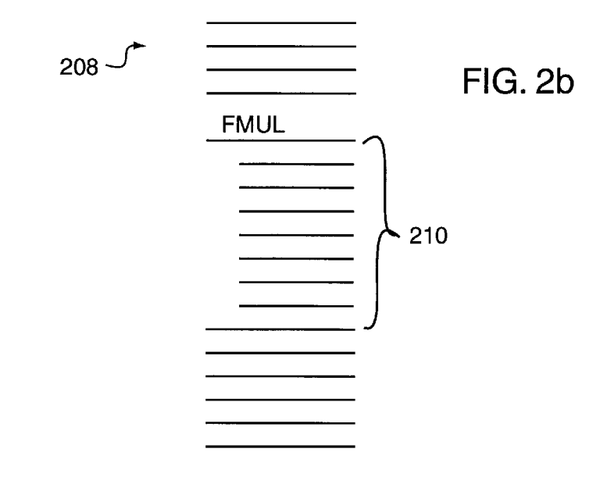

FIGS. 2a and 2b illustrate two methods of detecting floating point underflow. In one method, referred to in FIG. 2a, program code 202 detects the problem by performing a trap using a trap handler 204 in the program code to call a trap routine 206, which corrects the problem. In another method, referred to in FIG. 2b, program code 208 includes code 210 for detecting the problem whenever floating points are used in a manner where the problem can potentially arise, such as with multiplication and division operations.

By utilizing trap handler 206, all operations will cease while the problem is being addressed. When a trap is invoked, the state of the machine is stored before executing the trap routine, including the location of the instruction causing the trap. However, if the trap is not invoked, there is no per-operation overhead, only a one-time overhead per thread for setting up the trap handler, that will then monitor all floating point operations. On the other hand, program code 210 shows a technique of inserting code in the program to handle floating point underflow problems. With this method, each operation that might cause an underflow problem is followed by inline code to check for the problem and invoke a subroutine, if necessary, to produce the correctly rounded result. This method requires many unnecessary processor operations for each underflow that does not occur. However, when the problem is detected, it is solved without having to temporarily stop all operations and having to save a process or thread context to handle a trap. As mentioned above, floating point underflow is one example of a problem having alternative solutions on a given platform. Other problems can occur in which several implementations for solving a particular problem are available to the Java virtual machine, with each implementation being more efficient in some cases.

Therefore, it would be desirable to choose intelligently and dynamically an implementation to use in solving a problem arising from platform-specific variations. Using the floating point underflow problem as only an illustration, it would be desirable, for example, to detect and correct floating point underflow while reducing the amount of inline code necessary and avoiding the overhead of using a trap handler to dispatch a subroutine to correct the problem. It would also be desirable to allow a dynamic runtime compiler to choose one implementation, and also monitor its efficiency and change its implementation if desired.

SUMMARY OF THE INVENTION

According to the present invention, methods, apparatus, and computer program products are disclosed for a virtual machine to determine how to compile bytecode associated with a program while the program is executing. In one aspect of the present invention, an instruction in the program that may be compiled at runtime in multiple ways is retrieved and compiled in a particular way, typically the default way. The virtual machine may then determine at runtime that another way of compiling the instruction is more desirable and the bytecode instruction is then recompiled the other way.

In one embodiment, the executable code that contains the bytecode instruction to be recompiled is placed in a queue with other instructions that are to be recompiled. The virtual machine examines any changing requirements of the program that have developed at the program's execution where the requirements are derived from profile data on each one of the multiple ways the program can be compiled. In another embodiment, the particular bytecode instruction is recompiled by the virtual machine in a way that is different from the first or default way of compiling the instruction.

In another aspect of the invention, a method of generating different sets of executable instructions from a single program is provided. A program is compiled a certain way at runtime, such as the default way, to create one set of bytecode instructions. A virtual machine then determines at runtime that it would be desirable to compile the program in a different way and does so creating a different set of native instructions which replaces the first set.

In one embodiment, the virtual machine examines dynamically generated profile data on each of the ways a program can be executed to determine which way to recompile the program. The profile data includes a counter that stores the number of times the program was executed in a particular way. The virtual machine determines whether a particular set of native instructions should be replaced by another set of native instructions to more efficiently process dynamically changing requirements of the program.

In another aspect of the present invention, a system for executing a floating point instruction in a program is described. The system determines whether a particular instruction can create a floating point underflow and checks an indicator to determine how many times a floating point operation has caused an underflow. The floating point operation is compiled at runtime by a virtual machine one way if the indicator is below a predetermined value and is runtime compiled another way if the indicator is above the predetermined value.

In yet another aspect of the present invention, a method of generating instructions for detecting floating point underflow using either a trap routine or an explicit check is described. It is determined whether an operation in a program can create a floating point underflow and checks a counter to determine how many times a particular floating point operation caused an underflow. The operation is then runtime compiled using a trap routine if the counter is below a predetermined value and recompiled using an inline explicit check if the counter is above a predetermined value. Data associated with the trap routine and the inline explicit check are dynamically generated and stored at runtime.

BRIEF DESCRIPTION OF THE DRAWINGS

The invention will be better understood by reference to the following description taken in conjunction with the accompanying drawings in which.

DETAILED DESCRIPTION

Reference will now be made in detail to a specific embodiment of the invention. An example of this embodiment is illustrated in the accompanying drawings. While the invention will be described in conjunction with a specific embodiment, it will be understood that it is not intended to limit the invention to one embodiment. To the contrary, it is intended to cover alternatives, modifications, and equivalents as may be included within the spirit and scope of the invention as defined by the appended claims.

The present invention addresses choosing between alternative implementations of performing certain types of operations on a given architecture. Conventional methods typically generate code once, either statically at compile-time, or dynamically at runtime. The invention described and claimed herein allows a virtual machine to choose at runtime, which of a plurality of possible code segments will be generated by the runtime compiler based on runtime performance data. It allows a dynamic compiler to choose one implementation while monitoring its efficiency and changing the implementation if desired.

As described above, there are two common ways to detect and fix floating point underflow. One is to use a trap method which involves using code that is fast and short, but requires holding normal program execution while the trap is handled. The other method involves inserting code in the program to detect underflow after each floating point operation, which requires that the code be executed each time, but allows a program to proceed sequentially.

The underflow problem arises when it is necessary to store an extended floating point format result in a single or double floating point format. This can occur, for example, when a result is computed on an Intel architecture computer and then stored in single or double precision format. More specifically, the problem occurs when performing calculations using very small numbers, such as when the exponent of the result is less than the smallest exponent that can be represented in the destination (IEEE 754 single or double precision format), and the significand is the result of rounding the exact result. In order to store the closest representation in the destination, one must know that the significand is inexact (and therefore rounded), and which way it was rounded and why. This detection, and correction, is important to maintain the accuracy of very small numbers, e.g., to measure the rate at which a value is approaching zero.

Figure 3A:
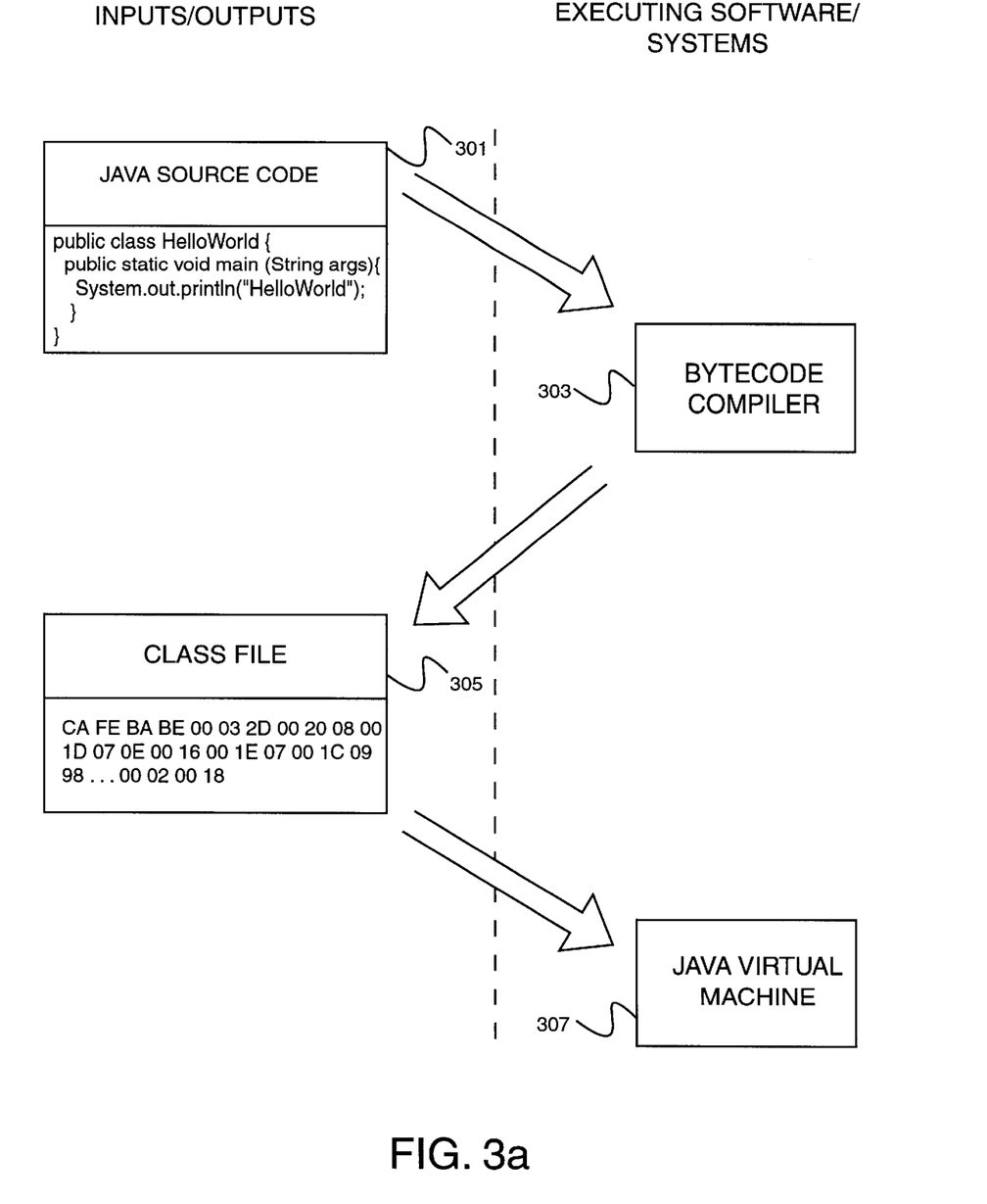
FIG. 3a is a block/process diagram illustrating the transformation of a Java™ program containing Java source code to native code to be run on a particular platform or computer.

FIG. 3a is a block diagram showing the inputs/outputs and the executing software/systems involved in creating native instructions from Java source code in accordance with one embodiment of the present invention. In other embodiments, the present invention can be implemented with a virtual machine for another language or with class files other than Java class files. Beginning with the left side of the diagram, the first input is Java source code 301 written in the Java™ programming language developed by Sun Microsystems of Mountain View, Calif. Java source code 301 is input to a bytecode compiler 303. Bytecode compiler 303 is essentially a program that compiles source code 301 into bytecodes. Bytecodes are contained in one or more Java class files 305. Java class file 305 is portable in that it can execute on any computer that has a Java virtual machine (JVM). Components of a virtual machine are shown in greater detail in FIG. 3B. Java class file 305 is input to a JVM 307. JVM 307 can be on any computer and thus need not be on the same computer that has bytecode compiler 303. JVM 307 can operate in one of several roles, such as an interpreter or a compiler. If it operates as a compiler, it can further operate as a "just in time" (JIT) compiler or as an adaptive compiler. When acting as an interpreter, the JVM 307 interprets each bytecode instruction contained in Java class file 305.

Figure 3B:
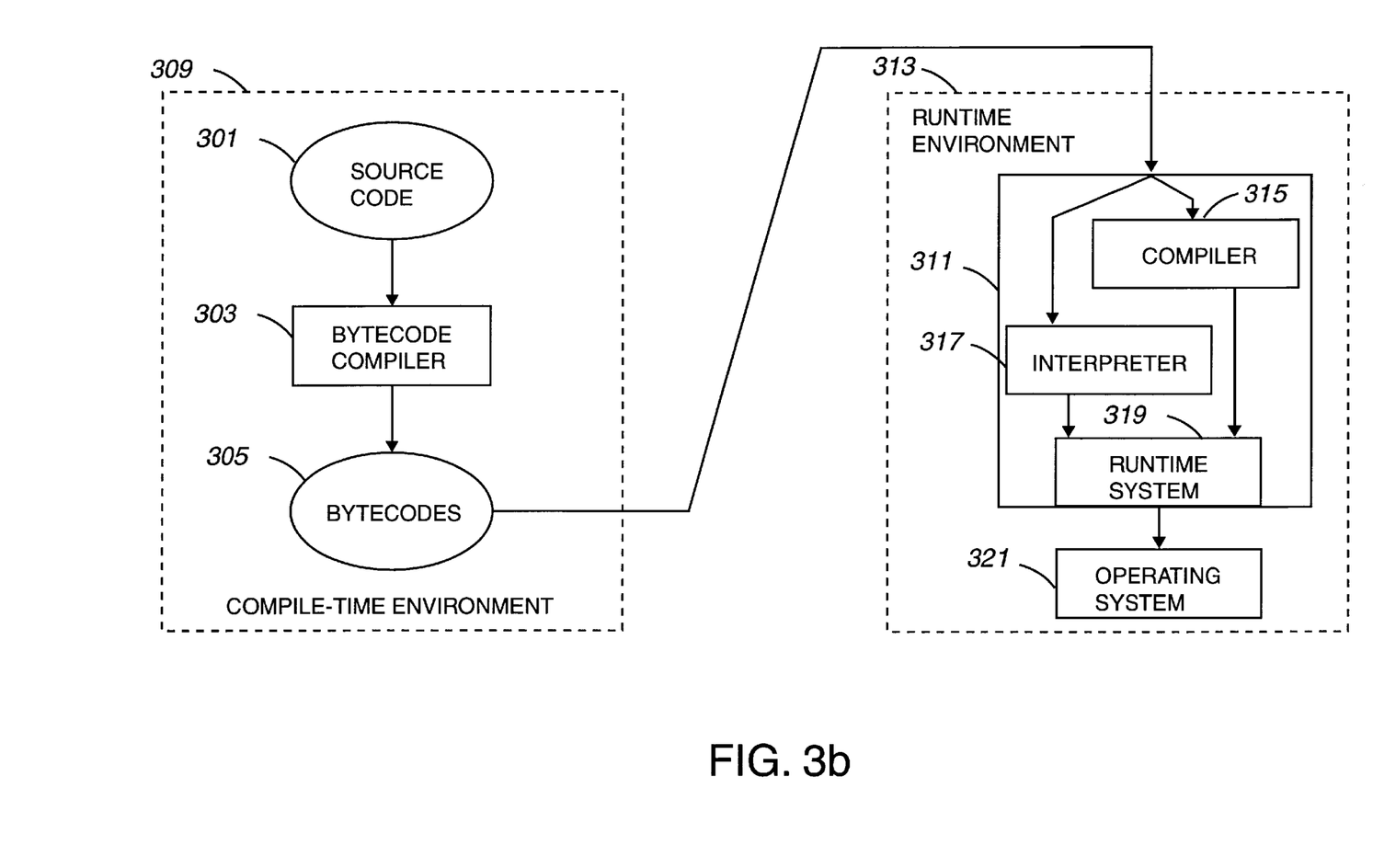
FIG. 3b is a diagrammatic representation of virtual machine 307, supported by computer system 1000 of FIG. 10 described below.

FIG. 3b is a diagrammatic representation of virtual machine 311 such as JVM 307, that can be supported by computer system 1000 of FIG. 10 described below. As mentioned above, when a computer program, e.g., a program written in the Java™ programming language, is translated from source to bytecodes, source code 301 is provided to a bytecode compiler 303 within a compile-time environment 303. Bytecode compiler 309 translates source code 301 into bytecodes 305. In general, source code 301 is translated into bytecodes 305 at the time source code 301 is created by a software developer.

Figure 10:
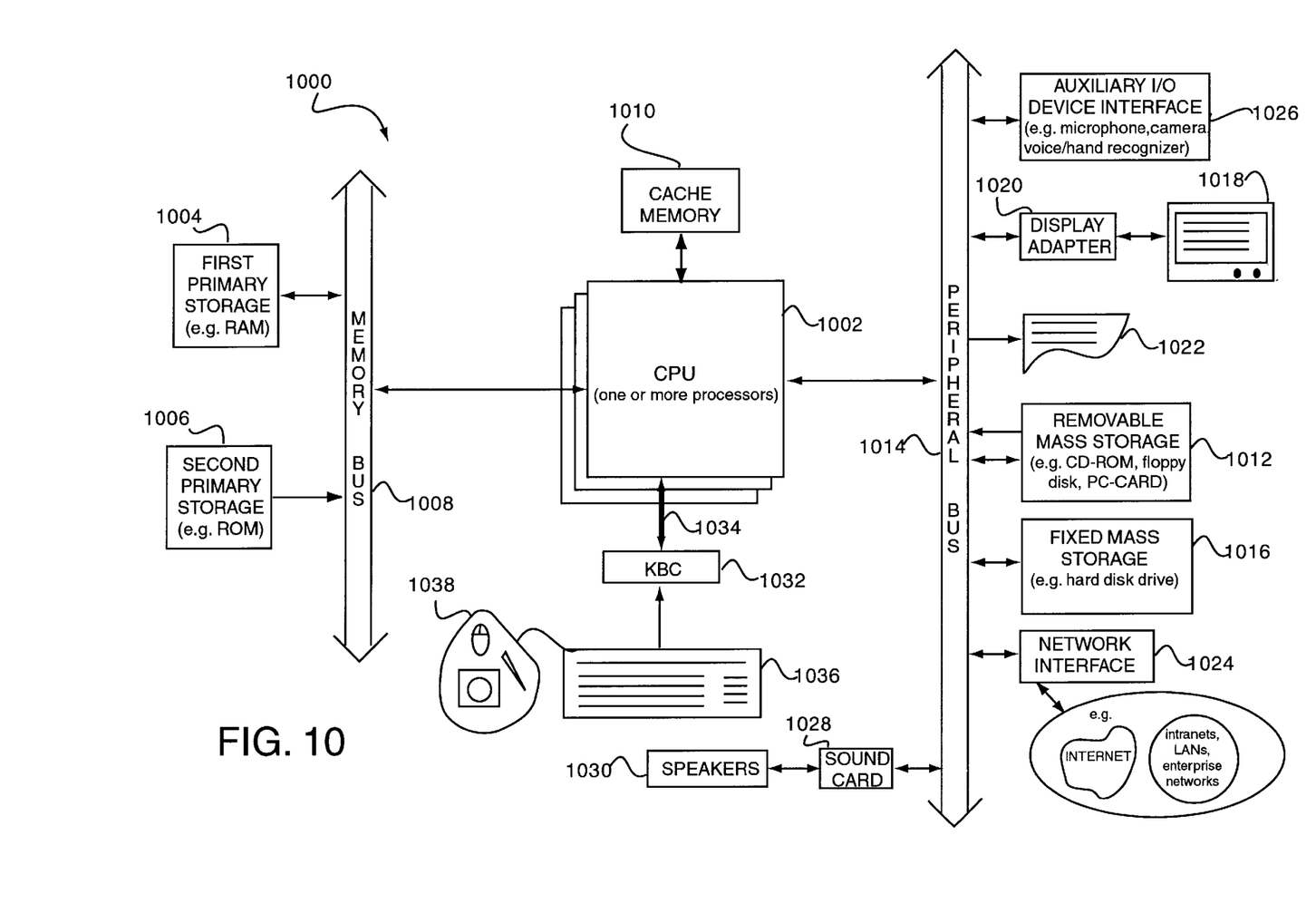
FIG. 10 is a block diagram of a typical computer system suitable for implementing an embodiment of the present invention.

Bytecodes 305 can generally be reproduced, downloaded, or otherwise distributed through a network, e.g., through network interface 1024 of FIG. 10, or stored on a storage device such as primary storage 1004 of FIG. 10. In the described embodiment, bytecodes 303 are platform independent. That is, bytecodes 303 may be executed on substantially any computer system that is running a suitable virtual machine 311. Native instructions formed by compiling bytecodes may be retained for later use by the JVM. In this way the cost of the translation are amortized over multiple executions to provide a speed advantage for native code over interpreted code. By way of example, in a Java™ environment, bytecodes 305 can be executed on a computer system that is running a JVM.

Bytecodes 305 are provided to a runtime environment 313 which includes virtual machine 311. Runtime environment 313 can generally be executed using a processor such as CPU 1002 of FIG. 10. Virtual machine 311 includes a compiler 315, an interpreter 317, and a runtime system 319. Bytecodes 305 can generally be provided either to compiler 315 or interpreter 317.

When bytecodes 305 are provided to compiler 315, methods contained in bytecodes 305 are compiled into native machine instructions (not shown). On the other hand, when bytecodes 305 are provided to interpreter 317, bytecodes 305 are read into interpreter 317 one bytecode at a time. Interpreter 317 then performs the operation defined by each bytecode as each bytecode is read into interpreter 317. In general, interpreter 317 processes bytecodes 305 and performs operations associated with bytecodes 305 substantially continuously.

When a method is called from an operating system 321, if it is determined that the method is to be invoked as an interpreted method, runtime system 319 can obtain the method from interpreter 317. If, on the other hand, it is determined that the method is to be invoked as a compiled method, runtime system 319 activates compiler 315. Compiler 315 then generates native machine instructions from bytecodes 305, and executes the machine-language instructions. In general, the machine-language instructions are discarded when virtual machine 311 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Figure 4:
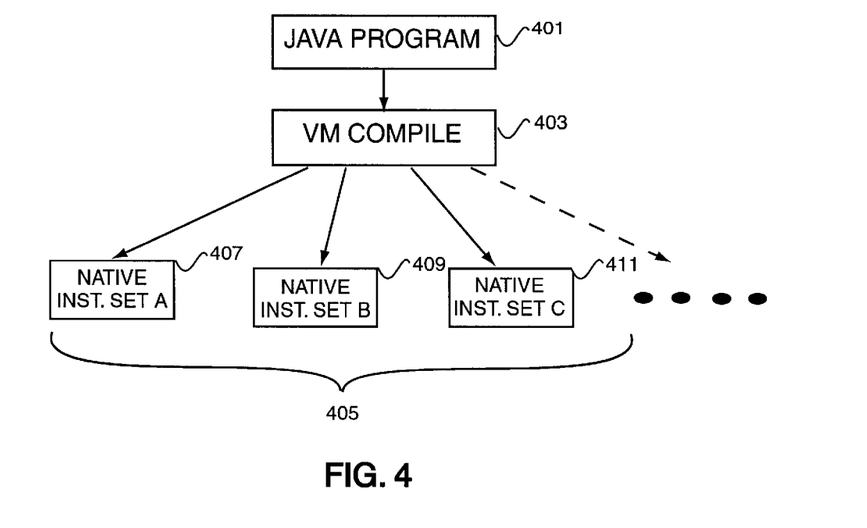
FIG. 4 is a block diagram showing how different versions of native instructions can be generated from a Java program.

As described earlier, instructions in a Java program can sometimes be compiled in more than one way. Following the earlier example, a floating point operation that can potentially cause underflow, such as a multiplication (FMUL) or division (FDIV) operation, can be compiled in at least two different ways: with an explicit check or a trap. FIG. 4 is a flow diagram describing how different versions of native instructions can be generated from a Java program. A Java program 401 (input 301 in FIGS. 3a and 3b), after being compiled by a bytecode compiler into Java class files, program 401 is runtime compiled from the bytecodes to native machine instructions by a JVM at block 403 (system 307 in FIG. 3a). A JVM is used for purposes of illustration only. As is known to a person skilled in the art, a virtual machine applies to general translation from a given input representation to a native instruction set where there is a choice of implementation. A method of compilation of the Java class files by a JVM is described in FIG. 5 below.

As mentioned earlier, a JVM can assume one of two roles: interpreting the Java bytecodes contained in the class files, or compiling the class files thereby creating native instruction sets which run on the same computer that has the JVM (i.e., they are not portable). Thus, with respect to the JVM performing as a compiler, a variety of native instruction sets can result from the same Java program depending on how the JVM compiles the bytecodes as referred to in blocks 405. Using the floating point operation as an example, native instructions 407 can contain explicit checks (i.e. inline) in all its FMULs or FDIVs, whereas native instructions 409 can contain only traps for the same floating point operations, or native instructions 411 can contain a combination of both.

It is notable here that FIG. 4 is not depicting a JVM deciding at runtime which compilation route to take (i.e., whether to compile the Java source code, interpret the code, or perform other operations with regard to how or when to execute the source code). Instead, FIG. 4 illustrates that if the compilation route taken by the JVM is to compile the code at runtime it can do so in different "ways," thereby creating different sets of native instructions. This process is described in detail with regard to FIG. 5.

Figure 5:
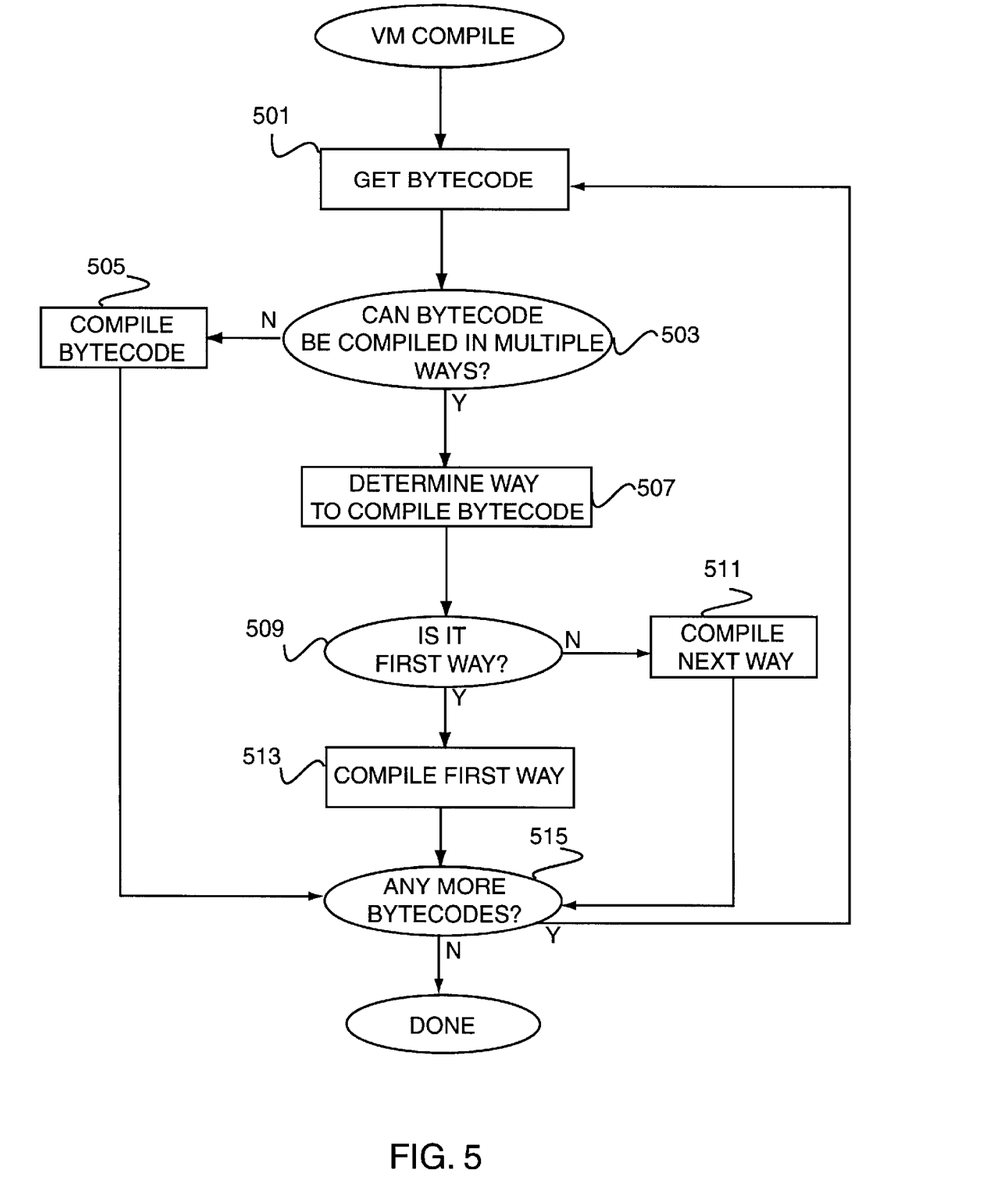
FIG. 5 is a flowchart showing a process of a Java virtual machine compiling Java bytecodes in accordance with one embodiment of the present invention.

FIG. 5 is a flowchart describing a process of a Java virtual machine compiling Java bytecodes into native machine instructions in accordance with one embodiment of the present invention. At step 501 the JVM retrieves one or more bytecode instructions from a Java class file. At step 503 the JVM determines whether a particular instruction can be compiled in more than one way. A specific example of a bytecode instruction that can be compiled in more than one way is described in greater detail in FIG. 7. If the JVM determines that the instruction can be compiled in only one way, such as an IADD or LSUB operation, the JVM compiles the bytecode in step 505. The JVM determines whether there are any remaining bytecodes at step 515 after it compiles the previously retrieved bytecode.

If the JVM determines that there are multiple ways to compile the bytecode, it proceeds to determine which way it will compile the bytecode at step 507. In the described embodiment, a mechanism is used by the JVM to make this determination, as described in greater detail in FIG. 6. The mechanism involves using dynamically generated profile information on each of the different ways a bytecode instruction can be compiled. At step 509 the JVM determines whether to compile the bytecode using a default way. The default way typically would be the way the runtime compiler writer believed, after considering the options available at the time, would ordinarily be the most efficient or logical way.

If, at step 509, the JVM determines that the bytecode should be compiled the first way, it does so at step 513 and produces a first native instruction set, such as native instruction set A in FIG. 4. It then determines whether there are any other bytecodes in the class file at step 515. If there are, it returns to step 501 to retrieve the next bytecode. If there are no more bytecodes the process is complete.

If, at step 509, the JVM determines that the way to compile the bytecode is not the first or default way, the JVM compiles the bytecode instruction using another compilation technique at step 511. It then proceeds as from step 513 and determines whether there are any remaining bytecodes to be compiled in step 515. For simplicity, only two different ways are referred to in FIG. 5, but the invention may be advantageously applied to three or more ways of compiling bytecodes.

Figure 6:
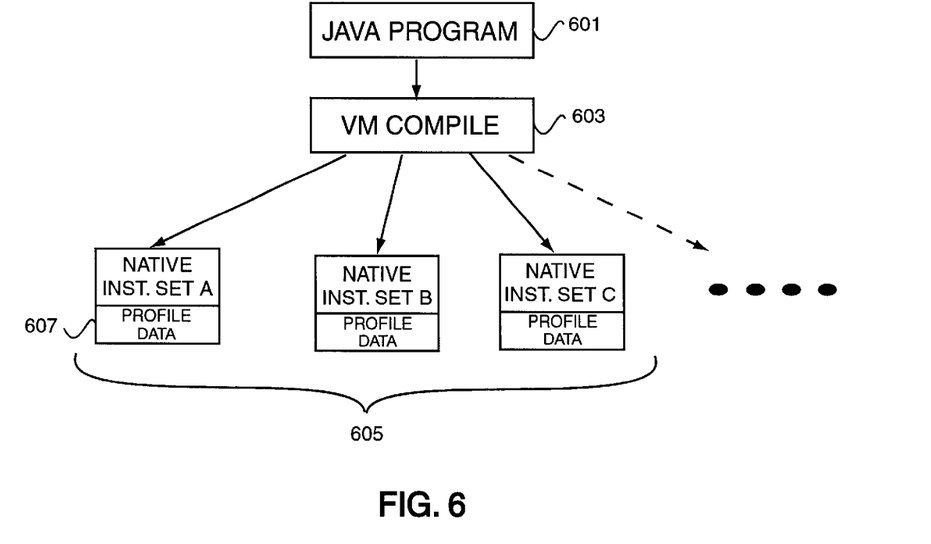
FIG. 6 is a block diagram illustrating how native instructions including dynamically generated profile data are generated in accordance with one embodiment of the present invention.

FIG. 6 is a block diagram illustrating how native machine instructions containing dynamically generated profile data are generated in accordance with one embodiment of the present invention. FIG. 6 is similar to FIG. 4 except that it includes information about each of the different ways a bytecode instruction can be compiled by a JVM. The information is generated if it is determined that there are multiple ways to compile the bytecode into native instructions as referred to in step 503 of FIG. 5. At the top of FIG. 6 is a Java program 601 which, after being compiled into bytecodes by a bytecode compiler, is input to a Java virtual machine 603. The JVM can then output several different native instruction sets 605 based on the different ways bytecodes can be compiled into native instructions. The native instruction sets 605 can also include a data space for storing dynamically gathered data 607 collected at runtime. This information may include profile information such as counters, timing data, and other information relating to the efficiency of the particular way the bytecodes are compiled.

The dynamically gathered data may also be stored with the native instructions and updated while the bytecodes are compiled by the JVM. In one embodiment, the JVM examines this information to determine which way the bytecode should be compiled, as first described in step 507 of FIG. 5. The dynamic profile data can be used by the JVM to determine whether, for example, a particular way of compiling continues to be efficient, how many times the bytecode has been executed that way, or whether a certain time period has elapsed. The JVM can query the data while compiling to determine if the current instructions are the most efficient implementation of a bytecode. The JVM can recompile any bytecodes it finds to be executing inefficiently. Once the JVM has determined how a bytecode should be compiled by querying data 607, it can proceed by determining whether it should be the first (default) way or one of the other ways as referred to at step 509 in FIG. 5.

Figure 7:
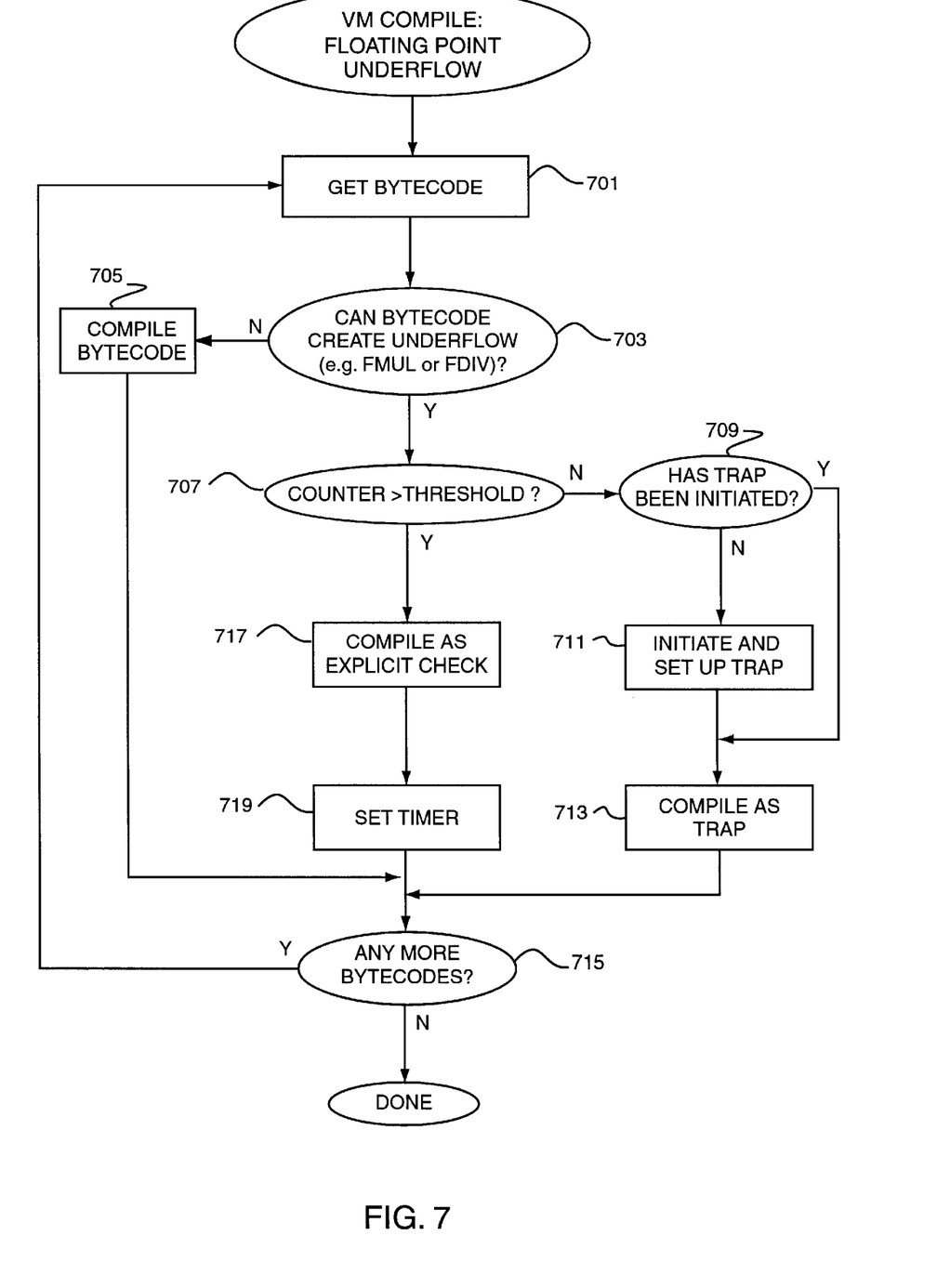
FIG. 7 is a flowchart showing a Java virtual machine compiling a floating point operation and determining how to correct an underflow if one arises in accordance with one embodiment of the present invention.

FIG. 7 is a flowchart describing a Java virtual machine compiling a floating point operation and determining how to correct an underflow if one arises in accordance with the described embodiment of the present invention. Compiling a floating point operation is a specific example of determining how to compile a program in several ways as discussed above. More generally, any application where compilation is guided by heuristics, or assumptions about the average behavior of the code (e.g., compiling TABLESWITCH instructions) can utilize methods of determining how to compile a program in several ways as discussed above. At step 701 the JVM retrieves a bytecode from a Java class file. At step 703 the JVM determines whether the bytecode instruction can create an underflow. Two typical floating point operations that can create an underflow are multiplication and division. In the described embodiment, if the JVM determines that the particular instruction cannot create an underflow problem, it proceeds to compile the bytecode as referred to in step 705.

If the instruction can potentially create an underflow problem, the JVM begins a process of determining how the underflow will be detected and corrected. As discussed above, in the described embodiment, the JVM can use either an explicit check (i.e., inline code) or a trap for detecting underflow. In other embodiments, other methods of detecting underflow can be used in place of or in addition to the described methods.

At step 707 the virtual machine checks whether a counter associated with the trap for detecting underflow has exceeded a predetermined threshold number. As part of the trap, instructions are included to increment a counter associated with each trapping instruction. Instructions are also included to reinvoke the bytecode translator if any particular counter exceeds some threshold. The counter is but one example of the type of information or profile data that can be checked to determine which way should be used to compile the particular bytecode, in this example a floating point instruction. Referring to FIG. 6, counters and similar information 607 can be maintained with the native instruction set. In other embodiments, other types of data, such as a timer, can be used in place of or in conjunction with a counter to determine which way the JVM should use to compile the bytecode.

As referred to, a counter can be updated each time a particular way has been used to execute a specific floating point operation which is being performed multiple times during single execution of a Java class file on a JVM. The counter update can occur, for example, from having the specific instruction in a conditional loop. In the described embodiment, each time a specific floating point operation causes an underflow that is corrected using the trap, a counter is incremented. Referring also to FIG. 5, the "first way", as described at step 509, can correspond to the trap way of compiling an instruction. In the described embodiment, it is desirable to avoid a counter when compiling the first way since it is preferable to reduce the number of operations on the more commonly taken path of execution. In the specific embodiment described in FIG. 7, if the counter for the particular floating point operation being compiled (and potentially creating an underflow) has not reached a threshold number, the JVM will continue using the first way, in this example, the trap way of compiling the instruction. If the counter has exceeded a threshold value, the instruction/method is flagged for recompilation a "second way." As described above, as part of the trap, instructions are included to increment a counter associated with each trapping instruction.

The first step in compiling the instruction using the trap way is to determine whether a trap handler has been set up as referred to at step 709. A trap handler is created the first time the trap is called by a Java class file. A trap handler is set up (by the JVM) the first time the compiler decides to compile code that needs the trap handler (the trap handler cannot be needed before that). In the described embodiment, and in most Java programs, there is one trap handler for each thread in the program. For a detailed description of threads, see *The Java Language Specification*, incorporated herein by reference. If a trap handler is created, this is done at step 711. If a trap handler is already set up for a particular thread, the JVM compiles the instruction using the trap way as referred to at step 713. This process of compiling the instruction using a trap handler is described in greater detail in FIG. 8. Once compiled, the JVM checks to see if there are any more bytecodes in the Java class files at step 715. If so, the JVM returns to step 701 and repeats the process.

At step 707, the JVM checks if the counter has exceeded a predetermined number (i.e., has the instruction been executed a certain way greater than the predetermined number of times). If so, the JVM compiles the bytecode a next way, which in the example referred to is using an explicit check (inline code) to detect and correct floating point underflow as referred to at step 717. In other embodiments, criteria other than a counter can be used to determine whether the bytecode translator should continue executing a compiled bytecode a certain way. The explicit check way of compiling the bytecode instruction is referred to in greater detail in FIG. 9. At step 719, the virtual machine sets a timer used in conjunction with the explicit check. The time is used to measure the length of time the explicit check way has been used. The virtual machine then checks whether there are any more bytecodes at step 715. If there are none, the process of compiling bytecodes in the the Java class files is complete.

Figure 8:
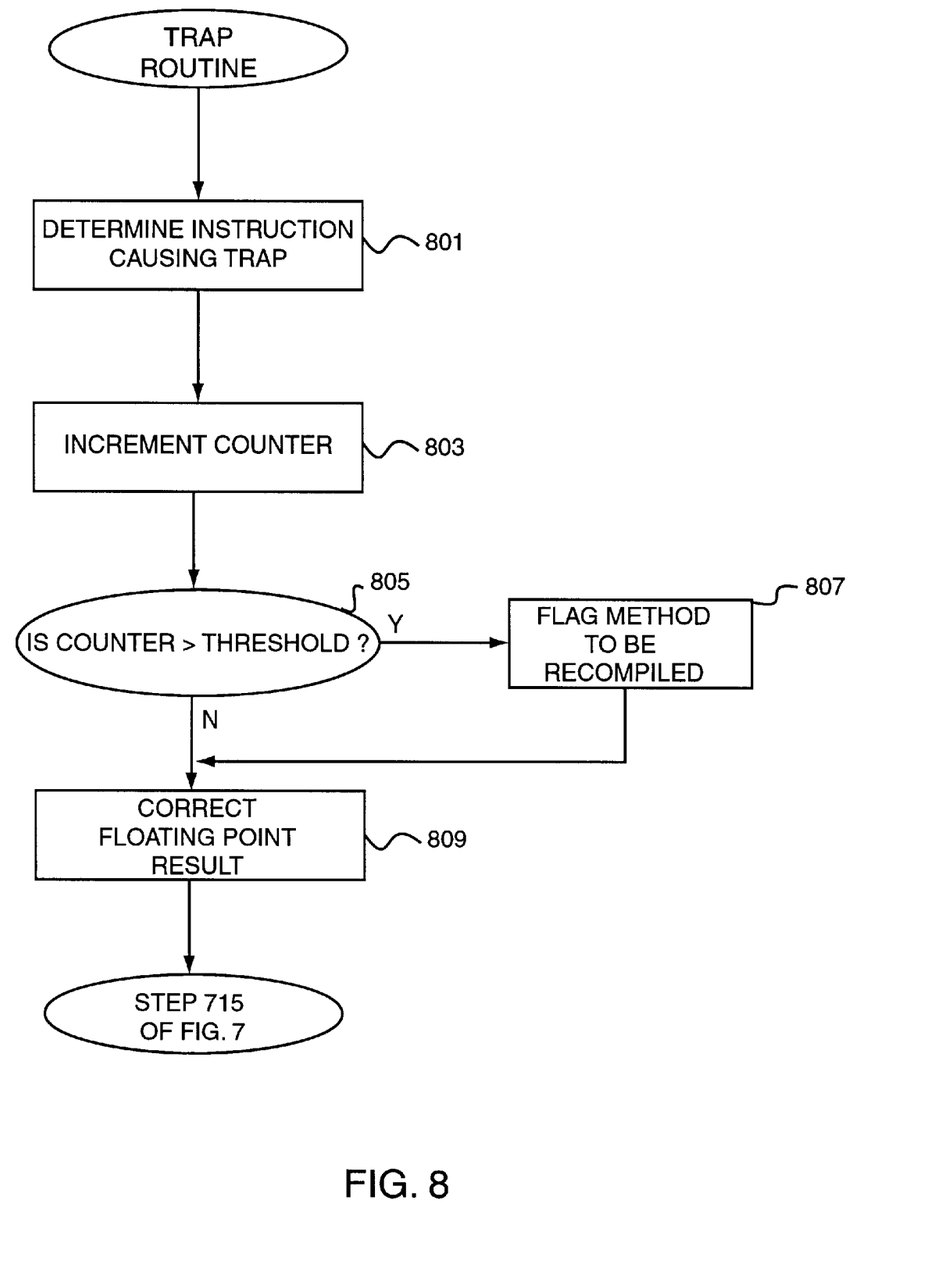
FIG. 8 is a flowchart showing a process of using a trap routine to handle underflow from a floating point instruction as referred to in step 713 of FIG. 7 in greater detail.

FIG. 8 is a flowchart describing in greater detail a process of using a trap to handle underflow from a floating point instruction as referred to in step 713 of FIG. 7. At step 801 the JVM determines which bytecode instruction in the Java class files is invoking the trap. Once the virtual machine determines which instruction is invoking the trap, it increments a counter associated with the floating point operation at step 803. The counter may be maintained with the native instructions as referred to in FIG. 6. Once the counter is incremented, the virtual machine checks the value of the counter at step 805. If the counter is greater than a threshold number, the module containing the floating point instruction is flagged to be recompiled at step 807.

In the described embodiment, the module is not recompiled immediately. Instead, it is placed in a queue to be recompiled at a time determined by the virtual machine based on its resources and level of activity. In other embodiments, the module can be compiled immediately or at a designated time. Regardless of the actual time the module is recompiled in the described embodiment, the virtual machine decides to recompile based on a counter. In other embodiments, the virtual machine can use other indicia from the dynamically generated profile data that can be stored with the native instructions as referred to in FIG. 6. Once the module has been flagged, or otherwise marked to be recompiled at step 807, the virtual machine returns to step 715 of FIG. 7 to check whether there are any more bytecodes in the Java class files. At step 805, if the counter has not exceeded a predetermined number, the JVM proceeds by using a trap to handle the floating point underflow at step 809. The virtual machine then returns to step 715 of FIG. 7.

Figure 9:
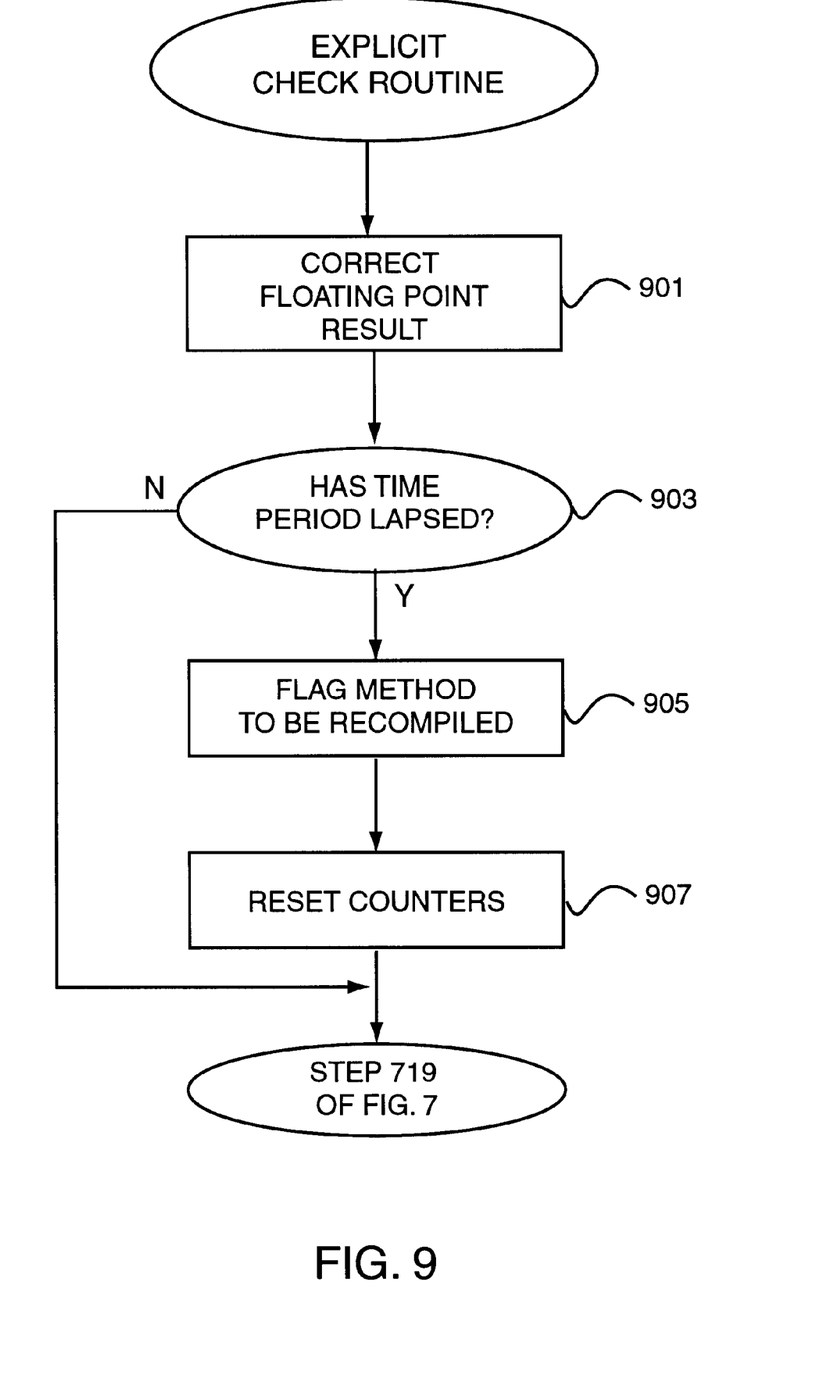
FIG. 9 is a flowchart showing an explicit check routine for detecting and correcting floating point underflow as referred to in step 717 of FIG. 7.

FIG. 9 is a flowchart describing an explicit check routine for detecting and correcting floating point underflow as referred to in step 717 of FIG. 7. As described above, an explicit check is code inserted in a native instruction set generated from the Java class files by the JVM to detect and correct a floating point underflow. FIG. 9 illustrates how a virtual machine can determine when to compile the explicit check way (which can correspond to the "next way" as referred to in step 511 of FIG. 5), or when to flag the module containing the floating point instruction to be recompiled, similarly to step 807 of FIG. 8. At step 901 the virtual machine uses the explicit check way to correct the floating point underflow. As described above, explicit counters can be inserted to track how many times underflow was detected by explicit checks, or a timer could be used. One potential drawback in using counters in this path is that they can be relatively expensive in terms of processing. In other embodiments, a combination of a timer and counter can be used. The virtual machine then checks how much time has elapsed from the time the explicit check was first used. Recall that in step 719 of FIG. 7, in the described embodiment, the virtual machine set a timer after the instruction was compiled as an explicit check. The same timer is used in step 903 to determine whether a predetermined time period has elapsed. In the described embodiment, if the predetermined time period has elapsed, the JVM flags or otherwise marks the module to be recompiled at step 905.

In one embodiment, the JVM recompiles the bytecodes after a certain amount of time has passed. This is done in order to reset the currently compiled way back to the default way thereby preventing the execution of the Java class files from growing potentially inefficient by not adapting to new circumstances. Once the module is flagged and placed in a queue to be recompiled at a time determined by the virtual machine, the counters and other profile data corresponding to the particular floating point instruction are reset or refreshed so that new profile information can be maintained. The counters are reset at step 907. The virtual machine then returns to step 719 of FIG. 7.

The present invention may employ various computer-implemented operations involving information stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms such as, producing, identifying, running, determining, comparing, executing, downloading, or detecting. It is sometimes convenient, principally for reasons of common usage, to refer to these electrical or magnetic signals as bits, values, elements, variables, characters, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

FIG. 10 is a block diagram of a general purpose computer system 1000 suitable for carrying out the processing in accordance with one embodiment of the present invention. For example, JVM 307, virtual machine 311, or bytecode compiler 303 can run on general purpose computer system 1000. FIG. 10 illustrates one embodiment of a general purpose computer system. Other computer system architectures and configurations can be used for carrying out the processing of the present invention. Computer system 1000, made up of various subsystems described below, includes at least one microprocessor subsystem (also referred to as a central processing unit, or CPU) 1002. That is, CPU 1002 can be implemented by a single-chip processor or by multiple processors. CPU 1002 is a general purpose digital processor which controls the operation of the computer system 1000. Using instructions retrieved from memory, the CPU 1002 controls the reception and manipulation of input information, and the output and display of information on output devices.

CPU 1002 is coupled bi-directionally with a first primary storage 1004, typically a random access memory (RAM), and uni-directionally with a second primary storage area 1006, typically a read-only memory (ROM), via a memory bus 1008. As is well known in the art, primary storage 1004 can be used as a general storage area and as scratch-pad memory, and can also be used to store input data and processed data. It can also store programming instructions and data, in addition to other data and instructions for processes operating on CPU 1002, and is typically used for fast transfer of data and instructions bi-directionally over memory bus 1008. Also, as is well known in the art, primary storage 1006 typically includes basic operating instructions, program code, data and objects used by the CPU 1002 to perform its functions. Primary storage devices 1004 and 1006 may include any suitable computer-readable storage media, described below, depending on whether, for example, data access needs to be bi-directional or unidirectional. CPU 1002 can also directly and very rapidly retrieve and store frequently needed data in a cache memory 1010.

A removable mass storage device 1012 provides additional data storage capacity for the computer system 1000, and is coupled either bi-directionally or uni-directionally to CPU 1002 via a peripheral bus 1014. For example, a specific removable mass storage device commonly known as a CD-ROM typically passes data uni-directionally to the CPU 1002, whereas a floppy disk can pass data bi-directionally to the CPU 1002. Storage 1012 may also include computer-readable media such as magnetic tape, flash memory, signals embodied in a carrier wave, Smart Cards, portable mass storage devices, and other storage devices. A fixed mass storage 1016 also provides additional data storage capacity and is coupled bi-directionally to CPU 1002 via peripheral bus 1014. Generally, access to these media is slower than access to primary storages 1004 and 1006. Mass storage 1012 and 1016 generally store additional programming instructions, data, and the like that typically are not in active use by the CPU 1002. It will be appreciated that the information retained within mass storage 1012 and 1016 may be incorporated, if needed, in standard fashion as part of primary storage 1004 (e.g. RAM) as virtual memory.

In addition to providing CPU 1002 access to storage subsystems, the peripheral bus 1014 is used to provide access to other subsystems and devices as well. In the described embodiment, these include a display monitor 1018 and adapter 1020, a printer device 1022, a network interface 1024, an auxiliary input/output device interface 1026, a sound card 1028 and speakers 1030, and other subsystems as needed.

The network interface 1024 allows CPU 1002 to be coupled to another computer, computer network, or telecommunications network using a network connection as referred to. Through the network interface 1024, it is contemplated that the CPU 1002 might receive information, e.g., objects, program instructions, or bytecode instructions from a computer in another network, or might output information to a computer in another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1002 can be used to connect the computer system 1000 to an external network and transfer data according to standard protocols. That is, method embodiments of the present invention may execute solely upon CPU 1002, or may be performed across a network such as the Internet, intranet networks, or local area networks, in conjunction with a remote CPU that shares a portion of the processing. Additional mass storage devices (not shown) may also be connected to CPU 1002 through network interface 1024.

Auxiliary I/O device interface 1026 represents general and customized interfaces that allow the CPU 1002 to send and, more typically, receive data from other devices. Also coupled to the CPU 1002 is a keyboard controller 1032 via a local bus 1034 for receiving input from a keyboard 1036 or a pointer device 1038, and sending decoded symbols from the keyboard 1036 or pointer device 1038 to the CPU 1002. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. Examples of computer-readable media include, but are not limited to, all the media mentioned above, including hard disks, floppy disks, and specially configured hardware devices such as application-specific integrated circuits (ASICs) or programmable logic devices (PLDs). The computer-readable medium can also be distributed as a data signal embodied in a carrier wave over a network of coupled computer systems so that the computer-readable code is stored and executed in a distributed fashion.

It will be appreciated by those skilled in the art that the above described hardware and software elements are of standard design and construction. Other computer systems suitable for use with the invention may include additional or fewer subsystems. In addition, memory bus 1008, peripheral bus 1014, and local bus 1034 are illustrative of any interconnection scheme serving to link the subsystems. For example, a local bus could be used to connect the CPU to fixed mass storage 1016 and display adapter 1020. The computer system referred to in FIG. 10 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. For example, although the trap and explicit inline check ways are described with regard to floating point underflow, other tools for detecting underflow can also be used and incorporated into the present invention. In another example, although two ways for compiling an instruction are described, the methods and apparatus of the present invention can accommodate more than two ways for compiling a program if more ways are available. Moreover, it should be noted that although the present invention has been illustrated using floating point underflow operations, the present invention can choose intelligently and dynamically an implementation to use in solving a problem arising from platform-specific variations. Floating point underflow is only one such problem. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of determining at runtime how to compile bytecode instructions associated with a floating point operation creating a floating point underflow in a computer program, the method comprising:

retrieving a bytecode instruction associated with the floating point operation that can be compiled in a plurality of ways;

determining whether the floating point operation can create a floating point underflow;

compiling the bytecode instruction a first way;

determining at runtime that a second way of compiling the bytecode instruction is desirable based on a predetermined criteria; and recompiling the bytecode instruction the second way.

2. A method as recited in claim 1, further comprising placing a module containing the bytecode instruction to be recompiled in a queue.

3. A method as recited in claim 1, further comprising determining at runtime that the bytecode instruction can be compiled in a plurality of ways.

4. A method as recited in claim 1, further comprising examining dynamically changing efficiencies of the computer program.

5. A method as recited in claim 4, further comprising gathering, at runtime, specific data on a currently executing one of the plurality of ways the computer program can be compiled.

6. A method as recited in claim 1, further comprising recompiling the bytecode instruction the second way when the second way is different from the first way.

7. A method of generating different sets of native instructions for executing a floating point operation creating a floating point underflow in a software program, the method comprising:

compiling the floating point operation in a first way to create a first set of native instructions;

determining whether the floating point operation can create a floating point underflow;

determining at runtime of the software program that it would be desirable to compile the floating point operation in a different way based on a predetermined criteria; and recompiling the floating point operation in the different way to create a second set of native instructions whereby the second set of native instructions replaces the first set of native instructions.

8. A method as recited in claim 7, further comprising examining dynamically generated specific data to determine which way would be beneficial to recompile the software program.

9. A method as recited in claim 8, wherein the dynamically generated specific data includes a counter that stores the number of times a particular compilation way has been executed.

10. A method as recited in claim 7, further comprising determining whether the first set of native instructions should be replaced by the second set of native instructions to more efficiently process dynamically changing requirements of the software program.

11. A method as recited in claim 7, further comprising determining which specific instructions in the software program are to be recompiled and marking the specific instructions at runtime of the software program.

12. A method of executing a floating point operation in a program, the method comprising:

determining whether a floating point operation can create a floating point underflow;

checking a particular indicator to determine how many times a specific floating point operation has caused an underflow; and compiling the specific floating point operation using a first way when the particular indicator meets predetermined criteria and otherwise compiling the specific floating point operation using a second way.

13. A method as recited in claim 12 further comprising dynamically generating and storing data on the first and second ways of compiling the specific floating point operation at runtime.

14. A method as recited in claim 12 wherein the first way is a trap routine and the second way is an explicit check, the explicit check implemented by inserting inline code into the program.

15. A method as recited in claim 14 further comprising:

checking whether a predetermined amount of time has passed from the time the specific floating point operation was compiled using an explicit check; and marking a module including the specific floating point operation to be recompiled if the predetermined amount of time has passed.

16. A method as recited in claim 14 further including initiating the trap routine.

17. A method as recited in claim 14 further including setting a timer if the specific floating point operation is compiled using an explicit check.

18. A method as recited in claim 14 wherein the particular indicator is a counter that is incremented each time the floating point underflow is handled using a trap routine.

19. A method as recited in claim 14, further comprising:
determining which floating point operation caused the trap routine to execute;
incrementing a counter; and
marking a module including the specific floating point operation to be recompiled if the counter is above a predetermined value.

20. A method as recited in claim 19, further comprising placing the module in a recompile queue if the module is marked to be recompiled.

21. A method as recited in claim 19, further comprising resetting the counter associated with the method if the method has been marked to be recompiled.

22. A method of generating instructions for detecting floating point underflow, the method comprising:
determining whether an operation in a program can create a floating point underflow;
examining an underflow indicator to measure a tendency of a particular floating point operation for causing an underflow;
compiling the particular floating point operation using a trap routine according to the tendency of the particular floating point operation for causing an underflow; and
recompiling the floating point operation using an inline explicit check according to the tendency of the particular floating point operation for causing an underflow.

23. A method as recited in claim 22, further comprising dynamically generating and storing data associated with the trap routine and the inline explicit check at runtime.

24. A method as recited in claim 22, wherein the particular floating point operation is contained in a module and further comprising placing the module containing the floating point operation to be recompiled in a recompile queue.

25. A computer program product for determining at runtime how to compile bytecode instructions associated with a floating point operation creating a floating point underflow in a computer program, comprising:
a computer code that retrieves a bytecode instruction associated with the floating point operation that can be compiled in a plurality of ways;
a computer code that determines whether the floating point operation can create a floating point underflow;
a computer code that compiles the bytecode instruction a first way;
a computer code that determines at runtime that a second way of compiling the bytecode instruction is desirable based on a predetermined criteria; and
a computer code that recompiles the bytecode instruction the second way; and
a computer readable medium that stores the computer codes.

26. A computer program product for executing a floating point operation in a program, comprising:
a computer code that determines whether a floating point operation can create a floating point underflow;
a computer code that checks a particular indicator to determine how many times a particular floating point operation has caused an underflow;
a computer code that compiles the particular floating point operation using a first way when the particular indicator meets predetermined criteria and otherwise compiling the floating point operation using a second way; and
a computer readable medium that stores the computer codes.

27. A system for determining at runtime how to compile bytecode instructions associated with a floating point operation causing a floating point underflow in a computer program, the system comprising:
a bytecode retriever for retrieving a bytecode instruction associated with the floating point operation that can be compiled in a plurality of ways;
a floating point underflow detector for detecting whether the floating point operation can create a floating point underflow;
a compiling module for compiling the bytecode instruction in one of a first way and a second way; and
an alternative compiling detector for determining at runtime that the second way of compiling the instruction is desirable based on a predetermined criteria.

28. A system as recited in claim 27, further comprising a module queue for holding one or more modules, each module containing the bytecode instruction to be recompiled.

29. A system as recited in claim 27, further comprising an efficiency analyzer examiner for examining dynamically changing efficiencies of the computer program.

30. A system as recited in claim 27, further comprising a runtime data collector for gathering, at runtime, specific data on a currently running one of the plurality of ways the computer program can be compiled.

31. A system for executing a floating point instruction in a program, the system comprising:
an instruction evaluator for determining whether a floating point instruction can create a floating point underflow;
a floating point underflow indicator for keeping a count of the number of times a particular floating point operation has caused a floating point underflow; and
a compiler for compiling the particular floating point operation using a first way when the particular indicator meets predetermined criteria and otherwise compiling the particular floating point operation using a second way, wherein the floating point underflow indicator is checked to determine how many times the particular floating point operation has caused an underflow.

32. A system as recited in claim 31 further comprising a data generator for dynamically generating and storing data on the first and second ways of compiling the floating point operation at runtime.

33. A system for determining at runtime how to compile bytecode instructions associated with a floating point operation creating a floating point underflow in a computer program having instructions comprising:
one or more processors; and
a computer readable medium storing a program for execution by the one or more processors comprising:
computer code that retrieves an instruction in the floating point operation that can be compiled in a plurality of ways;
computer code that determines whether the floating point operation can create a floating point underflow;
computer code that compiles the instruction in a first way;
computer code that determines at runtime that a second way of compiling the instruction is desirable based on a predetermined criteria; and
computer code that recompiles the instruction in the second way.

* * * * *